Feb. 24, 1948.　　　　F. FREITAG　　　　2,436,562
VEGETABLE AND FRUIT PEELER
Filed Sept. 20, 1945　　　　2 Sheets-Sheet 1

INVENTOR
FRITZ FREITAG
BY Walter S. Alston
ATTORNEY

Feb. 24, 1948.  F. FREITAG  2,436,562
VEGETABLE AND FRUIT PEELER
Filed Sept. 20, 1945  2 Sheets-Sheet 2
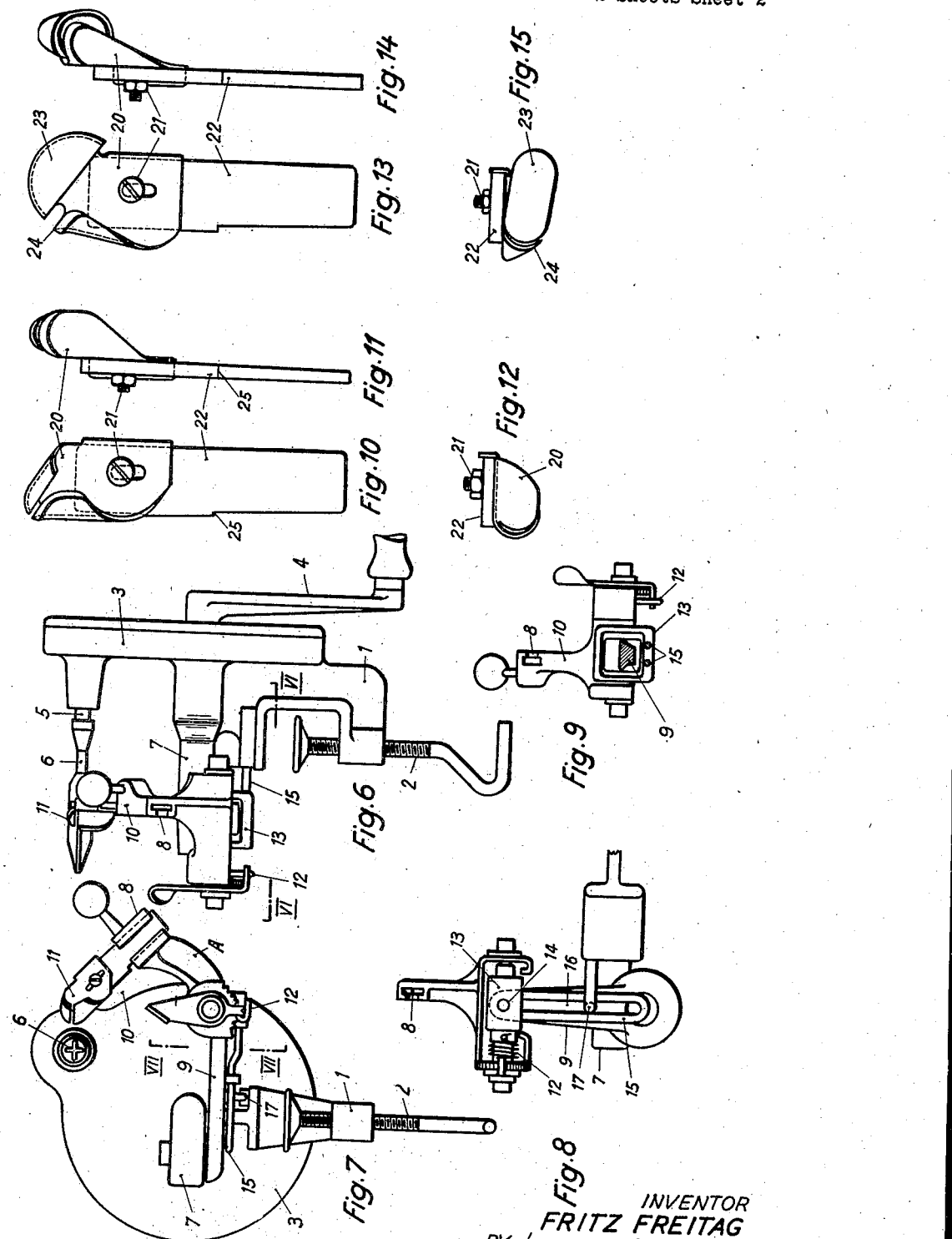
INVENTOR
FRITZ FREITAG
BY
ATTORNEY Patented Feb. 24, 1948

2,436,562

UNITED STATES PATENT OFFICE 2,436,562

VEGETABLE AND FRUIT PEELER

Fritz Freitag, Zurich, Switzerland

Application September 20, 1945, Serial No. 617,477

Section 1, Public Law 690, August 8, 1946
Patent expires July 3, 1963

7 Claims. (Cl. 146—43)

This invention relates to a practical and efficient device for peeling potatoes and paring the peel from fruits and vegetables. It provides a half-automatic machine, which allows large quantities of potatoes, for example, to be peeled quickly and cleanly in a time and labour saving way.

An object of the invention is to provide a peeler which will not only insure universal application to any kind of fruit, potatoes, etc., but also simplify generally the construction of such machines so as to bring down the manufacturing costs to the very lowest possible limit.

A further object of the invention is the provision of a vegetable peeler of greater efficiency and simplified design wherein the instrumentalities are of such a nature and so arranged that a large amount of mechanism is eliminated and new and useful functions result.

A further object of the invention is to provide a peeler having a skewer and a cutter, both of which are driven from a single spindle.

The accompanying drawings show various constructions of the device according to the invention in schematic diagrams.

Figs. 6 and 7 are side and front elevations of a second constructional form of the invention;

Figs. 8 and 9 show sections on lines VI—VI of Fig. 6 and VII—VII of Fig. 7; and

Figs. 10 to 15 show details.

Figure 2:
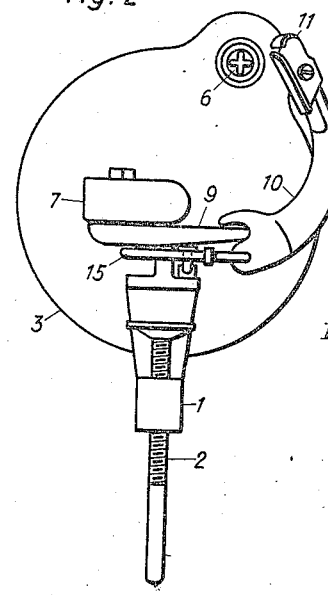
Figs. 1, 2 and 3 are views from the side, front and top of a first constructional form of the invention.
Figure 1:
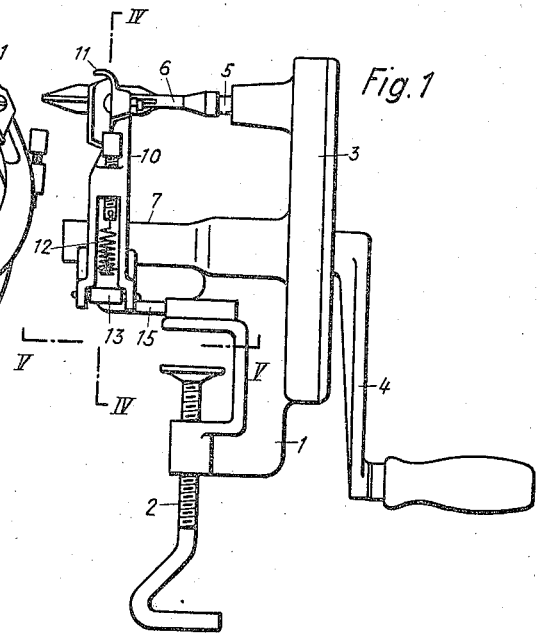
Figure 4:
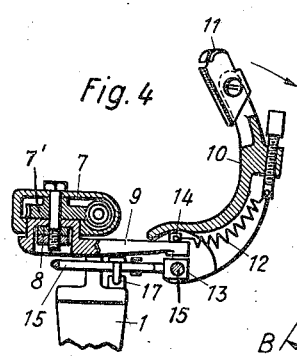
Figs. 4 and 5 show details and sections according to lines IV—IV and V—V in Fig. 1.

The drawings show a frame 1, which can be fixed to a table by aid of a clamp 2. The frame 1 carries a gear-box 3 with a wheel-set, driven by a crank 4, which wheel set operates a shaft 5. The skewer 6 which is exchangeably mounted on shaft 5 revolves during operative work and carries the article to be peeled or pared. The frame 1 is provided with an extension 7. The latter is equipped with a friction-disc 8, operated by means of a worm gearing from the crank 4. The friction disc 8 is pressed, on one side, against an arm 9 which thus is yieldingly coupled to the wheel 7' of the worm gearing. The free end of arm 9 carries a pivot pin 14 extending parallel to the axis of rotation of wheel 7'. A joint piece 13 is rotatable about pivot pin 14. A link 15 engages in the joint piece 13 from opposite sides and extends underneath and along arm 9 when the joint piece 13 is midway between the limits it can oscillate about the pivot 14. The extension of the link 15 is provided with a longitudinal slot 16 into which engages a guide pin 17 secured to the frame 1 and spaced from the axis of wheel 7' a distance shorter than the length of arm 9. The ends of link 15 which engage the joint piece 13 serve as axles for a lever 10 carrying the peeling knife 11. A spring 12 restrains the movement of lever 10 in relation to arm 9.

Figure 3:
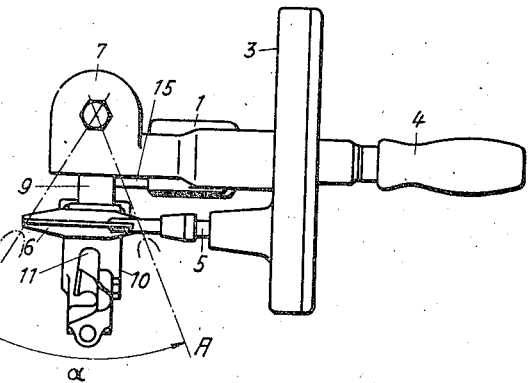
Figure 5:
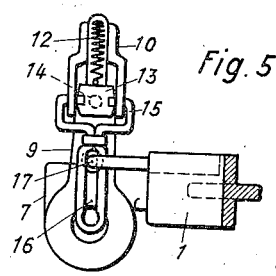

Now it will be clear that lever 10 will turn about the axis of gear wheel 7' when the latter turns in the one or other direction during the operation of the machine. Simultaneously, the lever 10 will also turn about pivot 14 owing to the link 15 in engagement with the stationary guide pin 17. In consequence, the cutting knife 11 will be rotated about an angle A—B (Fig. 3) over the surface of the fruit to be peeled. The connection of the knife lever 10 to the link 15 in combination with spring 12 allows the knife to follow the circumference of the fruit, and as the lever 10 is supported by the ends of the link 15, the knife 11 is kept in an approximately tangential position to the circumference of the article to be peeled. One potato having been peeled (position B, Fig. 3) the arm 9 is brought back to the starting position (A) by hand. Thereby the knife is again placed in such position that it touches the surface of the next piece to be peeled.

In Figs. 6 to 15 the various parts that cooperate in the same manner are marked by the same members. A difference exists in this case insofar as the lever 10, supplied with a handle, carries the knife in a guide 8. Various blades can be inserted in the aforementioned guide. The examples are shown in Figs. 10 to 15.

The knife 20 shown in Figs. 10–12 and suitable for peeling or paring vegetables with a smooth, even surface is fixed to a tapered bracket 22 by means of a screw 21.

In contrast to the knife shown in Figs. 10 to 12 the Figs. 13–15 show a type of knife suitable for peeling vegetables and fruit with indented surfaces and recesses.

In Figs. 13–15 the body of the knife is fixed by a screw to the wedge-shaped support 22 and is equipped with a hood 23 acting as a guide. This hood 23 raises the knife 24 from the cavities and hollows of the fruits.

What I wish to secure by United States Letters Patent is:

1. In a fruit or vegetable peeler the combination of a rotatable skewer, a lever arm pivoted about an axis crossing the skewer axis at right angles, a knife-carrying arm, and a joint piece connecting said lever arm and said knife-carrying arm, said joint piece being pivoted on said lever arm, and said knife-carrying arm being pivoted on said joint piece about an axis at right angles to the pivot axis about which said joint piece is turnable in relation to said lever arm.

2. In a fruit or vegetable peeler the combination of a rotatable skewer, a lever arm pivoted about an axis crossing the skewer axis at right angles, a driving connection between said skewer and said lever arm to turn the latter while said skewer is rotated, a joint piece pivoted at the free end of said lever arm about an axis parallel to the pivot axis of said lever arm, guiding means in engagement with said joint piece to turn the latter about its pivot axis while said lever arm is turned, and a knife-carrying arm pivoted with its one end on said joint piece about an axis at right angles to the pivot axis of said joint piece.

3. A device as claimed in claim 2, said guiding means comprising an arm connected to said joint piece and having a guiding face, and a stationary member in engagement with said guiding face.

4. In a fruit or vegetable peeler the combination of a rotatable skewer, a lever arm pivoted about an axis crossing the skewer axis at right angles, a driving connection between said skewer and said lever arm to turn the latter while said skewer is rotated, a joint piece pivoted at the free end of said lever arm about an axis parallel to the pivot axis of said lever arm, a slotted arm connected to said joint piece and extending substantially in the direction of said lever arm pivot, a stationary member in engagement with the slot of the slotted arm, and a knife-carrying member being pivoted to said joint piece about an axis at right angles to the pivot axis of said joint piece.

5. A device as claimed in claim 4, said slotted arm including an axle engaging in said joint piece and said knife-carrying member being mounted on said axle.

6. A device as claimed in claim 4, said slotted arm being a piece of wire bent in the shape of a wire loop the ends of which engage said joint piece and constitute journals for said knife-carrying arm, said stationary member engaging said loop at a point spaced from the pivot axes of said lever arm and said joint piece.

7. A device as claimed in claim 4, said slotted arm being wire loop the ends of which are secured to said joint piece, and the joint piece including at least one lateral stub axle at right angles to the pivot of said piece on said lever arm, said knife-carrying member being mounted on said axle.

FRITZ FREITAG.

REFERENCES CITED

The following references are of record in the file of this patent:

UNITED STATES PATENTS

| Number | Name | Date |
|---|---|---|
| 1,490,493 | Tenney | Apr. 15, 1924 |
| 1,730,888 | Heumann | Oct. 8, 1929 |
| 2,075,551 | Stahl | Mar. 30, 1937 |

FOREIGN PATENTS

| Number | Country | Date |
|---|---|---|
| 642,730 | Germany | Mar. 13, 1937 |
| 210,809 | Switzerland | Oct. 16, 1940 |